United States Patent [19]
McMurtrey, Sr. et al.

[11] Patent Number: 5,557,186
[45] Date of Patent: Sep. 17, 1996

[54] LINEAR ACCELERATED DEVICE

[75] Inventors: Kevin D. McMurtrey, Sr., Ft. Lauderdale; Arthur M. Rossi, Hollywood; Robert J. Cichon, Jr., Plantation; Karen A. Briggs, Stuart; Jonathan C. Ely, Pompano Beach, all of Fla.

[73] Assignee: Encore Computer Corporation, Ft. Lauderdale, Fla.

[21] Appl. No.: 443,527

[22] Filed: May 18, 1995

Related U.S. Application Data

[63] Continuation of Ser. No. 252,996, Jun. 2, 1994, Pat. No. 5,469,037.

[51] Int. Cl.$^6$ .............................. G11B 33/02; H05K 5/00
[52] U.S. Cl. ...................... 318/626; 312/223.2; 369/75.1; 364/708.1
[58] Field of Search ..................................... 318/626, 652, 318/264, 265, 266, 286, 466, 467, 468; 364/708.1; 369/12, 75.1; 312/330.1, 223.1, 223.2

[56] References Cited

U.S. PATENT DOCUMENTS

| | | |
|---|---|---|
| 3,858,091 | 12/1974 | Wilkinson . |
| 4,149,218 | 4/1979 | Carrubba et al. ........................ 361/383 |
| 4,208,079 | 6/1980 | Prado et al. ............................ 312/202 |
| 4,423,827 | 1/1984 | Guigan . |
| 4,739,445 | 4/1988 | Tragen .................................... 361/384 |
| 4,754,397 | 6/1988 | Varaiya et al. . |
| 4,899,254 | 2/1990 | Ferchau et al. ......................... 361/384 |
| 5,158,347 | 10/1992 | Warren et al. . |
| 5,168,424 | 12/1992 | Bolton et al. ........................... 361/384 |
| 5,388,032 | 2/1995 | Gill et al. ................................ 364/146 |

*Primary Examiner*—Bentsu Ro
*Attorney, Agent, or Firm*—Keck, Mahin & Cate

[57] ABSTRACT

High density disc drive apparatus that packs a large number of disc drives into a computer cabinet. The disc drives are removably installed in disc cages mounted on shelves of a drawer that slides out the front of the cabinet. A linear actuator drives the drawer and a controller moderates the actuator to ensure smooth start-up and stopping of the drawer so selected disc drives can be replaced during computer operation without disturbing the operation of the remaining disc drives. Built-in pin connectors facilitate bringing I/O and power cables to the disc drives and the desired replacement.

41 Claims, 17 Drawing Sheets

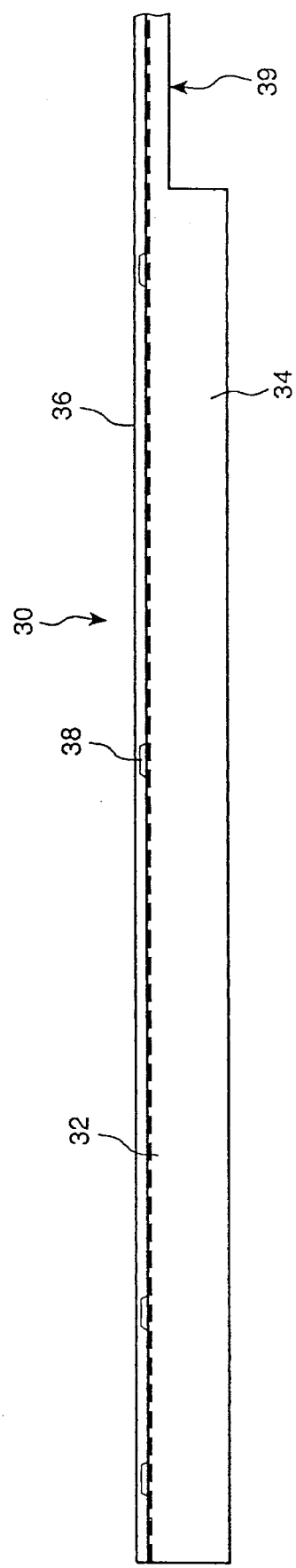
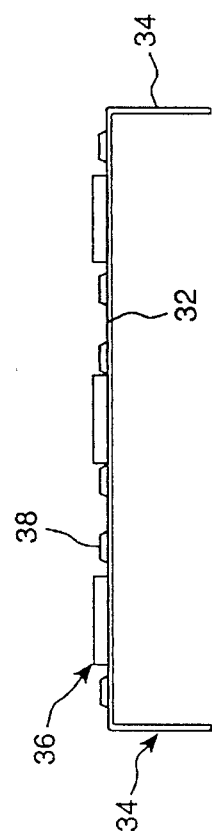
Fig. 6a
Fig. 6b

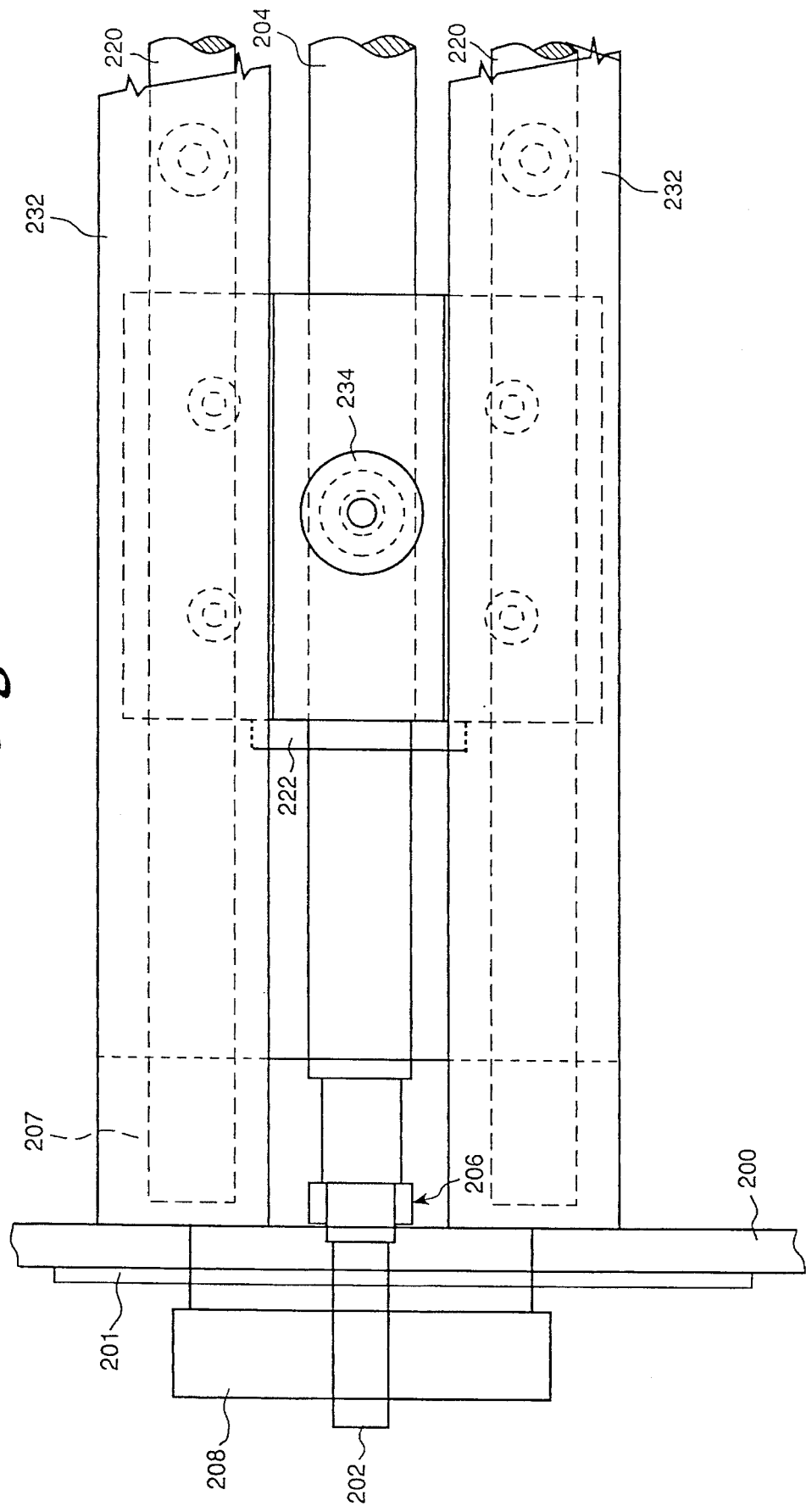

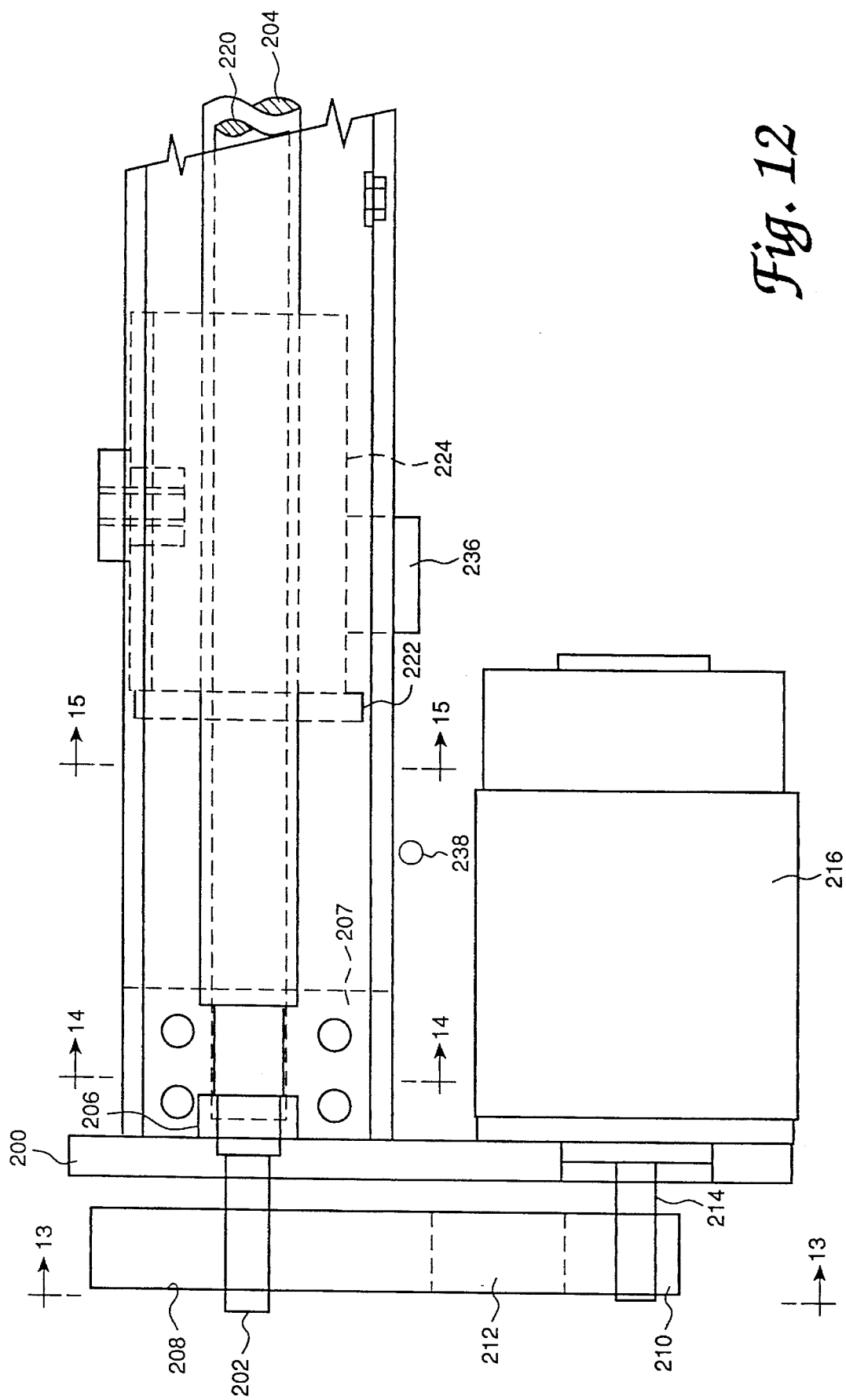

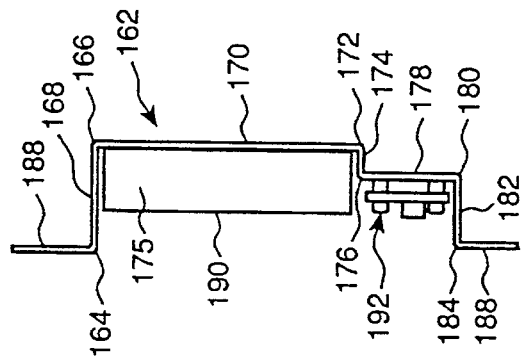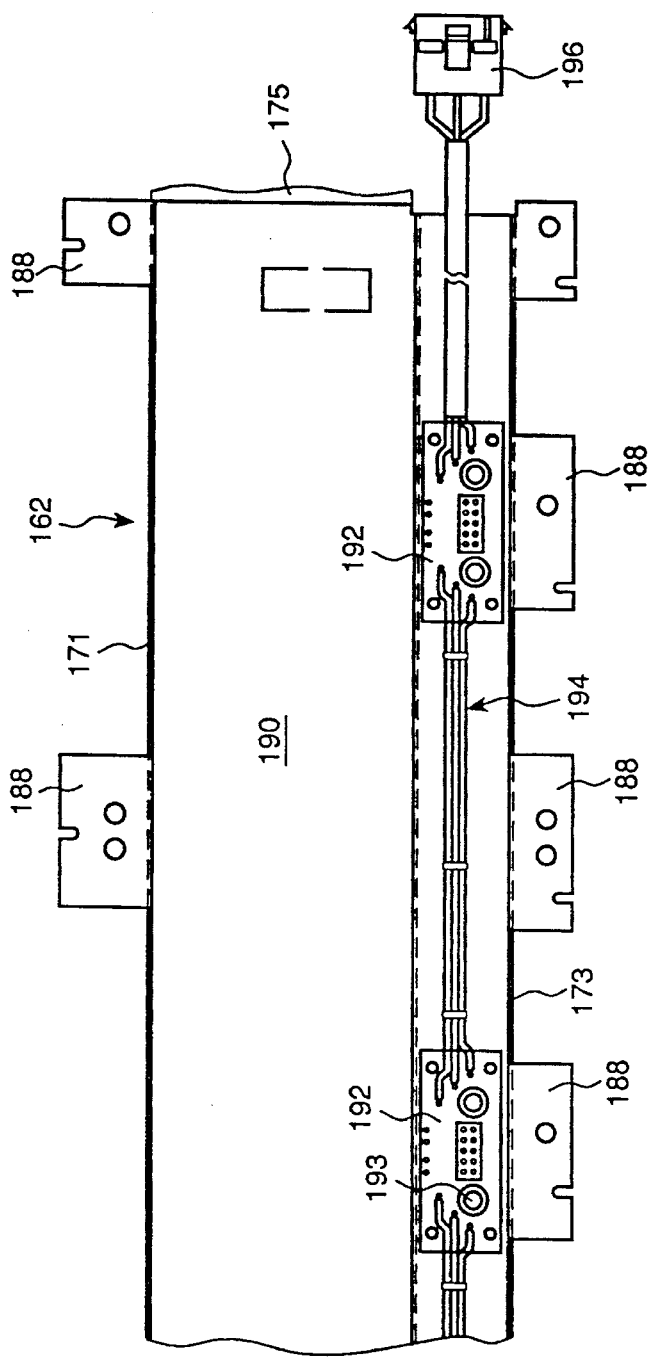

5,557,186

LINEAR ACCELERATED DEVICE

This is a Continuation of application Ser. No. 08/252,996, filed Jun. 2, 1994, now U.S. Pat. No. 5,469,037.

FIELD OF THE INVENTION

The present invention relates to a high density disc drive storage apparatus for computer applications.

BACKGROUND OF THE INVENTION

Conventionally, disc drive storage devices are mounted in standard computer cabinets from the front and extend toward the rear of the cabinet. The mounting may be either vertically or horizontally oriented, but in either case, because the disc drive is relatively short in length compared to the depth of the cabinet, only a small volume on the front side of the cabinet is used, the major rear volume is not available or accessible for mounting the disc drive storage devices and generally is used for other purposes. This, of course, results in not the best or most economical use of the available space.

SUMMARY OF THE INVENTION

The object of the present invention is to provide a high density storage apparatus utilizing a standard computer cabinet that enables utilization of substantially the entire available volume of the cabinet for mounting disc drives while enabling servicing or changing of individual disc drives even while the computer(s) that the disc drives are a part of is running. This object is achieved by providing an apparatus that includes mounting one or more drawers in the computer cabinet which, upon command, can be smoothly withdrawn from the cabinet to expose the disc drives from the front of the cabinet so that they are readily available for servicing or changing; this withdrawing occurring without shock to or disruption of the normal operation of the disc drives.

DESCRIPTION OF THE FIGURES

Other and further objects of the invention will become readily apparent from the following detailed description of a preferred embodiment of the invention when taken in conjunction with the appended drawings in which:

FIGS. 6a and 6b are side and end views of the slide skirt;

FIGS. 8a and 8b are a front view of the card cage and a section taken along line 8a–8b of FIG. 8a;

FIG. 11 is a top view of the drive for the drawer;

FIG. 12 is a side view of the drive for the drawer;

FIG. 16 is a front view of the DC shield assembly;

FIG. 17 is an end view of the shield assembly;

DETAILED DESCRIPTION OF THE PREFERRED EMBODIMENT

Figure 1:
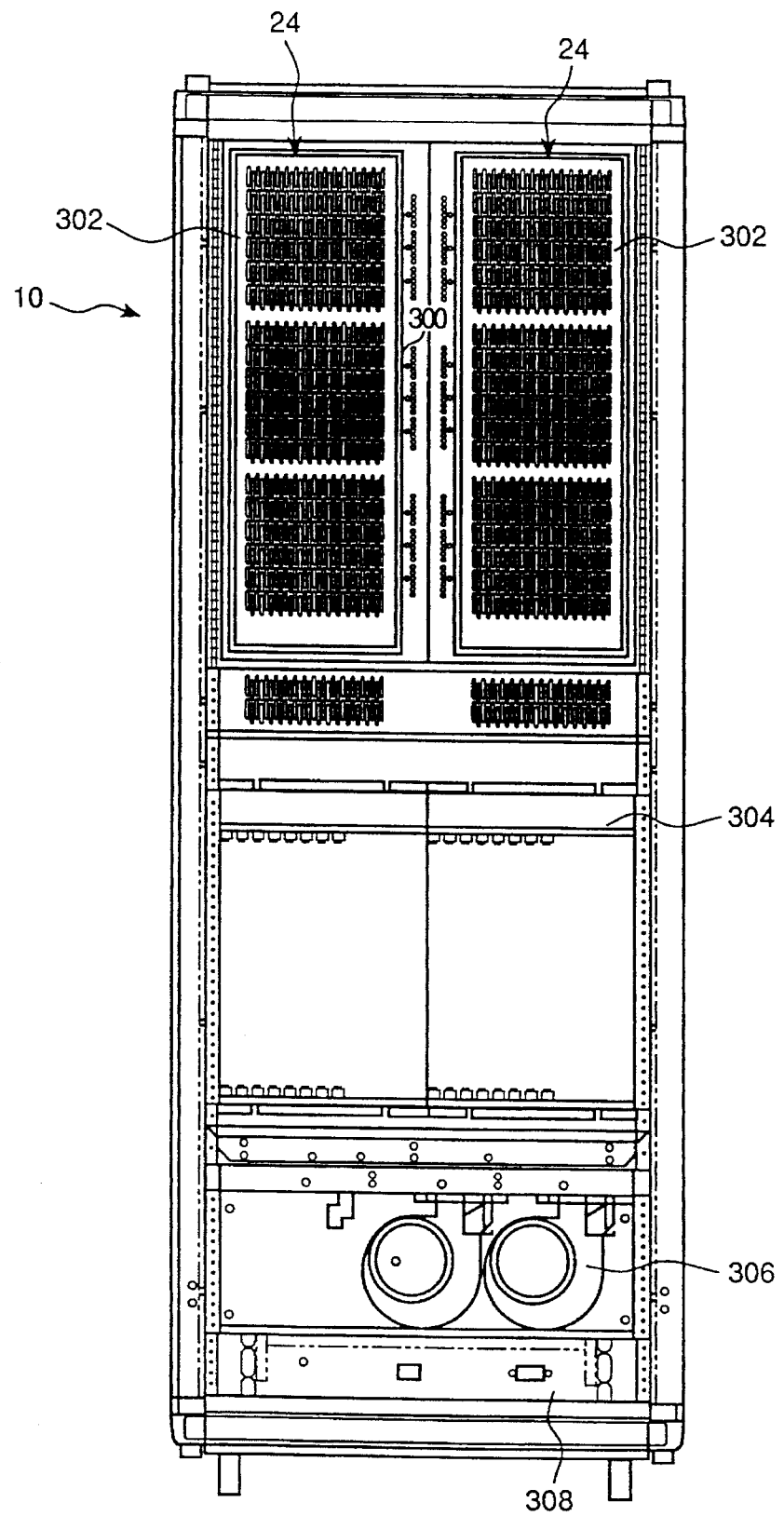
FIG. 1 is a front view of the novel cabinet.
Figure 2:
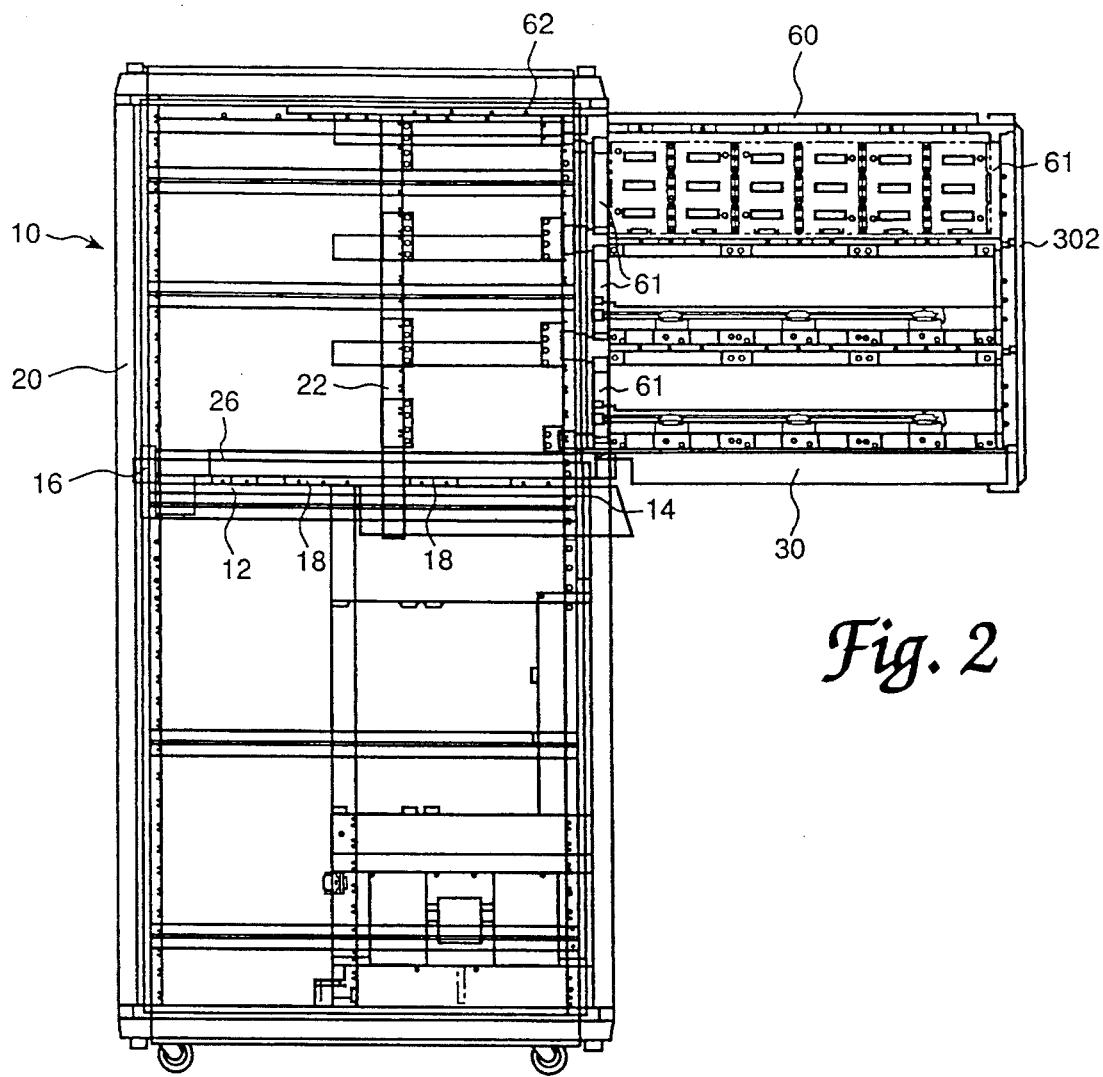
FIG. 2 is a side view of the novel cabinet showing a drawer withdrawn.
Figure 3:
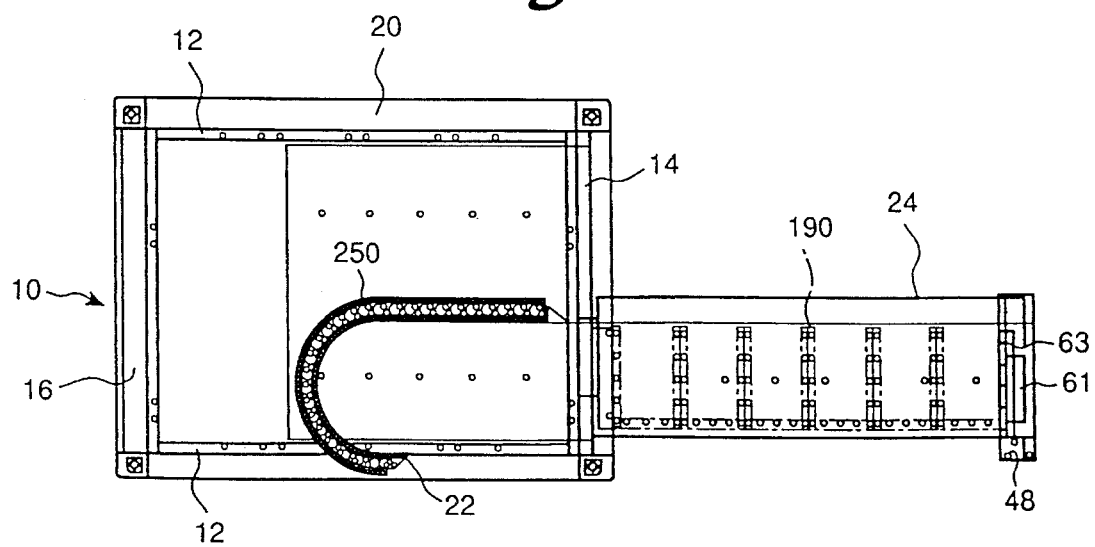
FIG. 3 is a top view of the novel cabinet with the top of the cabinet and drawer removed.
Figure 4:
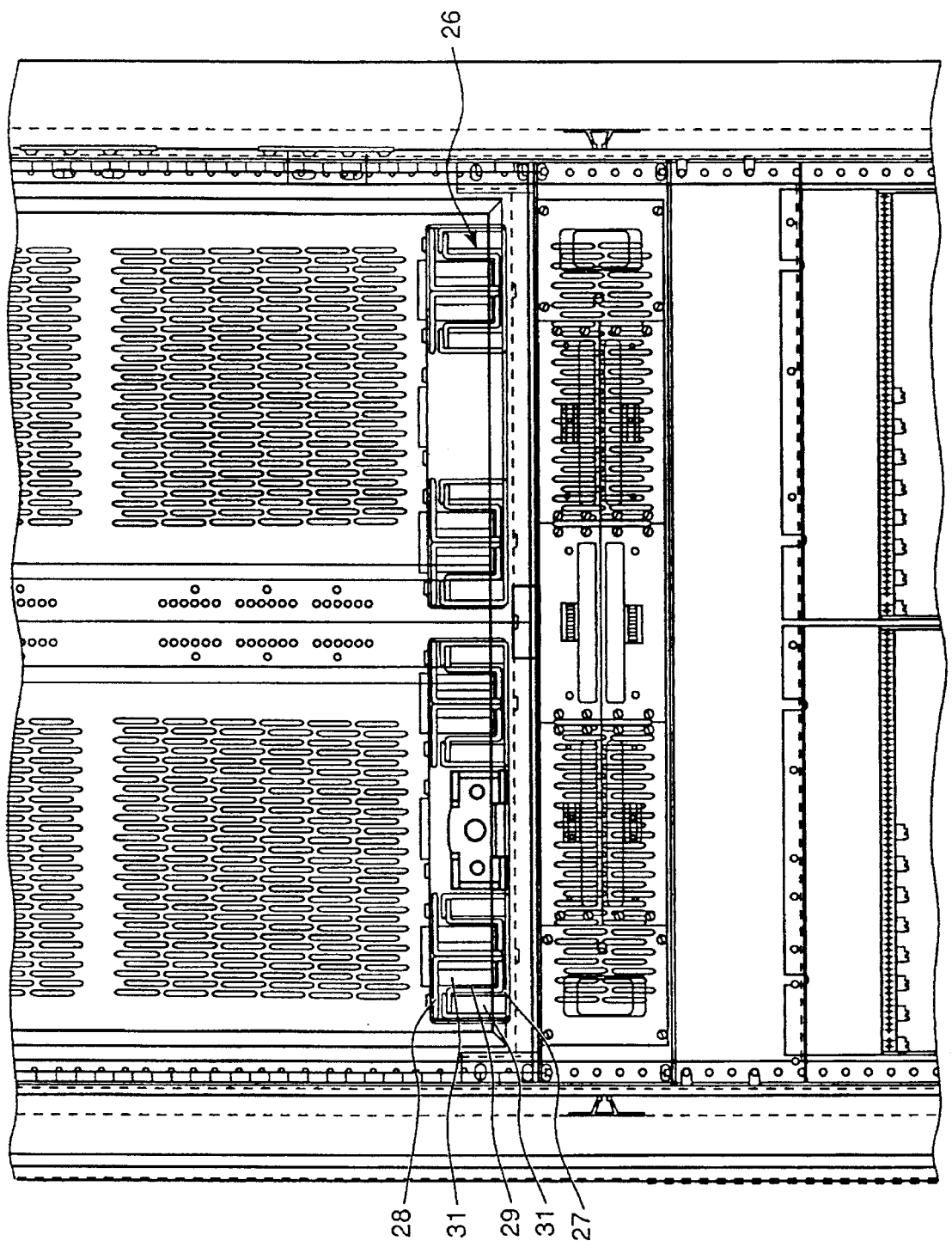
FIG. 4 is a rear view showing the slide with parts of the drawer removed.

Referring now to the drawings, a detailed preferred embodiment will be described. FIGS. 1–3 show the inventive structure. A conventional computer cabinet 10 is fitted about its midplane with side rails 12, front and back rails 14 and 16 and a series of spaced bars or slate 18 that extend transversely across the cabinet and are fixed to the rails 12. All of the rails 12, 14 and 16 are fixed to the frame 20 of the cabinet. In addition, on each side of the cabinet, a bar 22 is fixed at its lower end to side rail 12 intermediate its ends and at its upper end to frame 20.

A pair of elongated drawers, generally designated as 24, are mounted side-by-side in the space or volume of the cabinet above the slats 18. The drawers 24 are each mounted on a spaced apart pair of three part telescoping slides 26 with the bottom part 27 of each slide 26 bolted to slots 18, the top part of 28 of each slide 26 screwed or bolted to a skirt 30 and the intermediate part 29 of each slide 26 floating. Suitable stops (not shown) and rollers 31 are arranged between the parts of the slides 26 to enable each drawer to move easily horizontally from a closed position as shown in FIG. 1 to a fully open position as shown in FIG. 2.

Figure 7A:
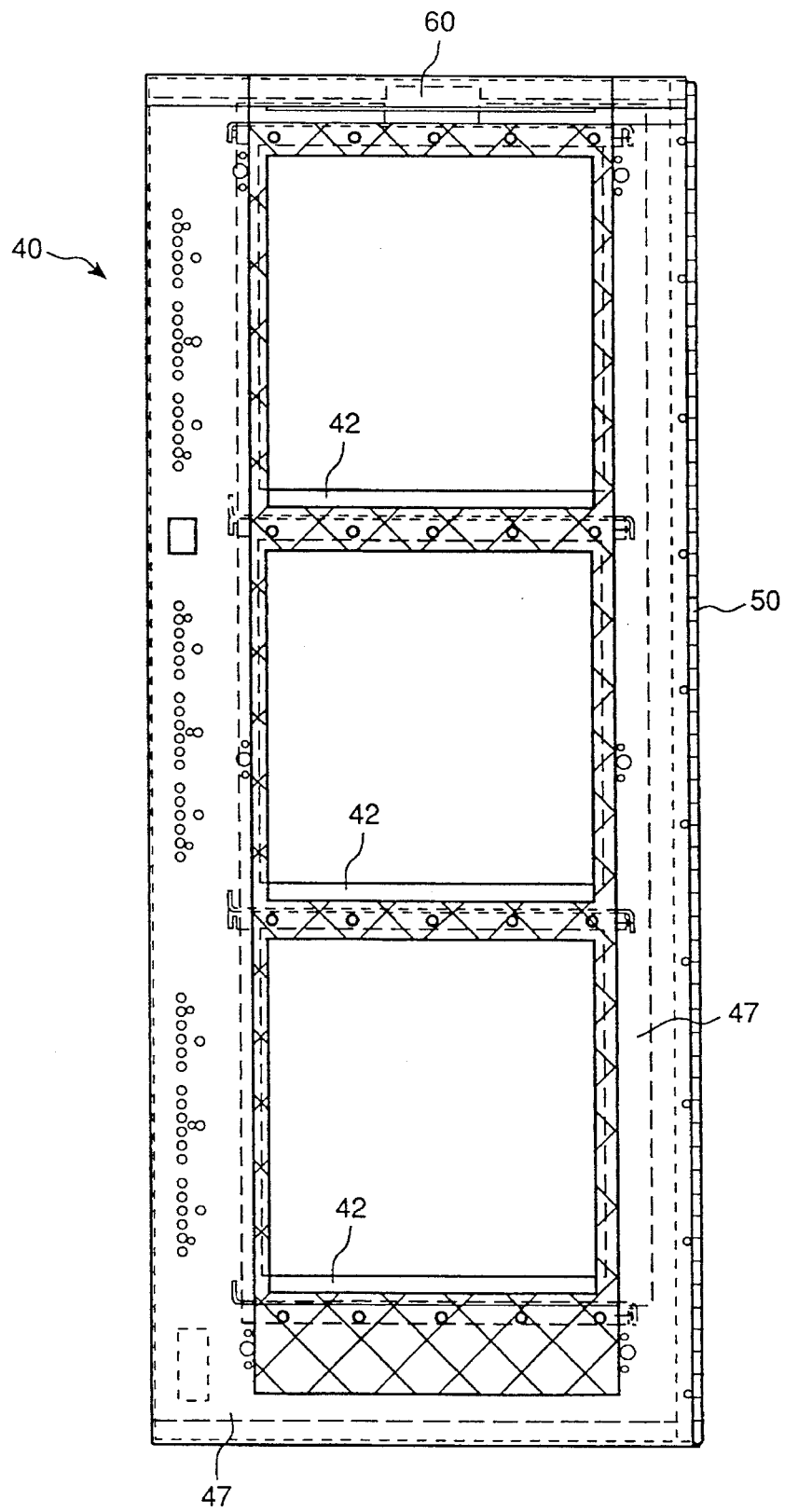
FIGS. 7a and 7b are front and side views of the bracket frame.
Figure 7B:
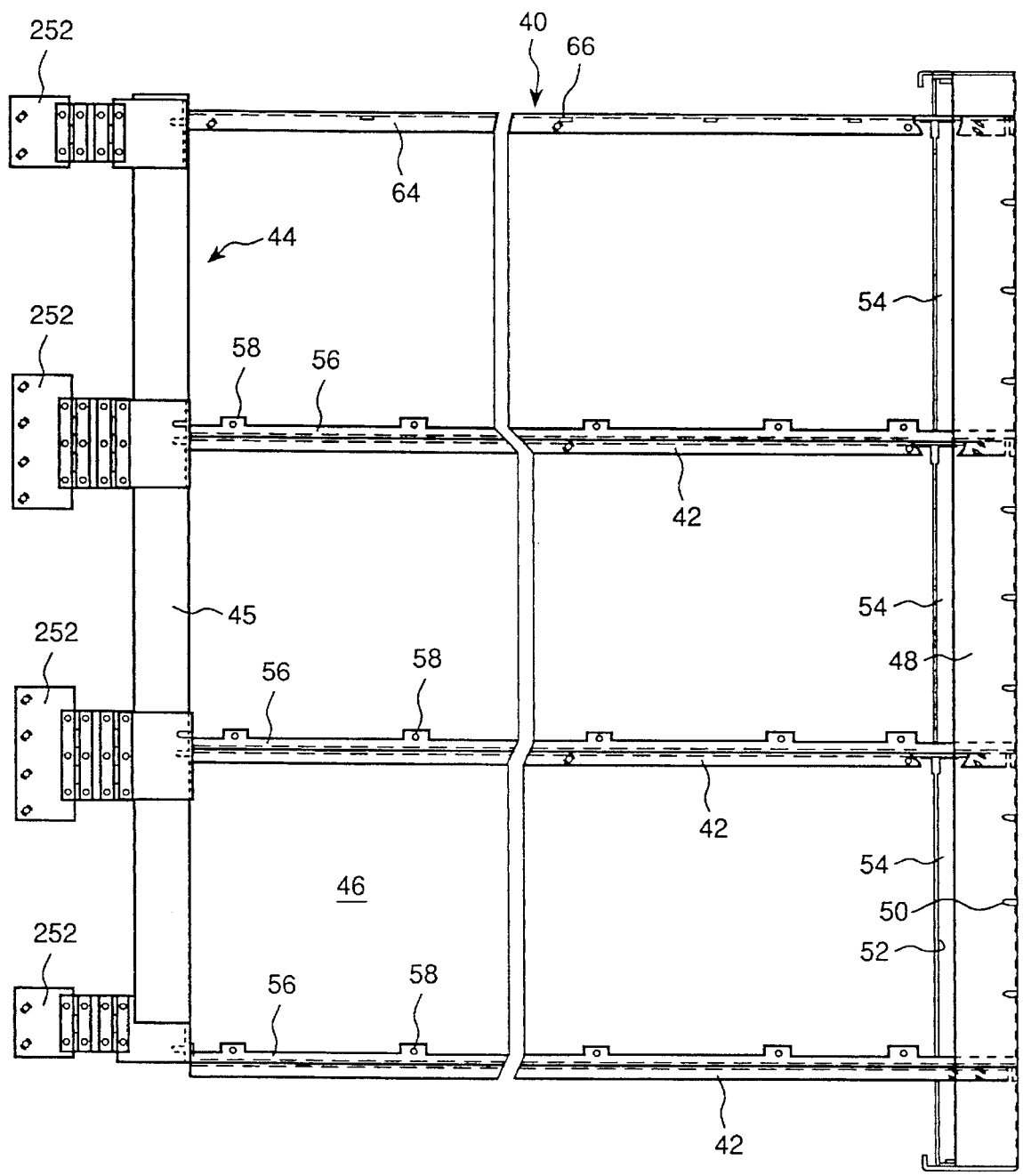
Figure 8A:
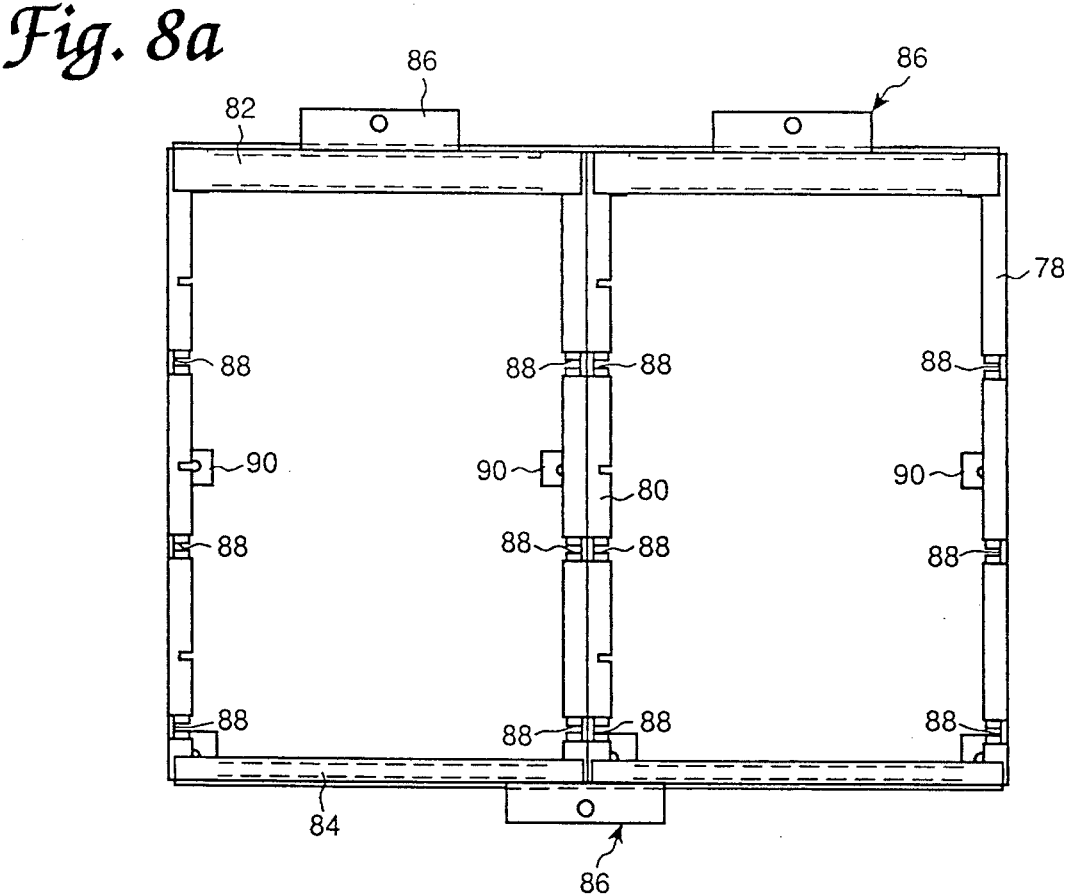
Figure 8B:
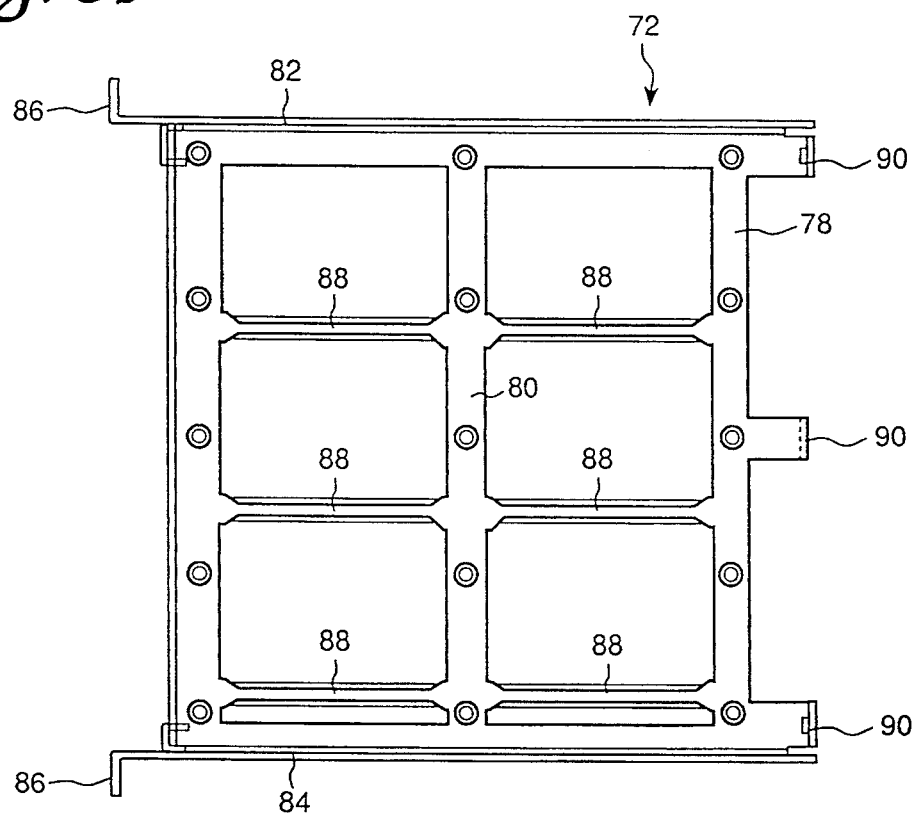
Figure 9A:
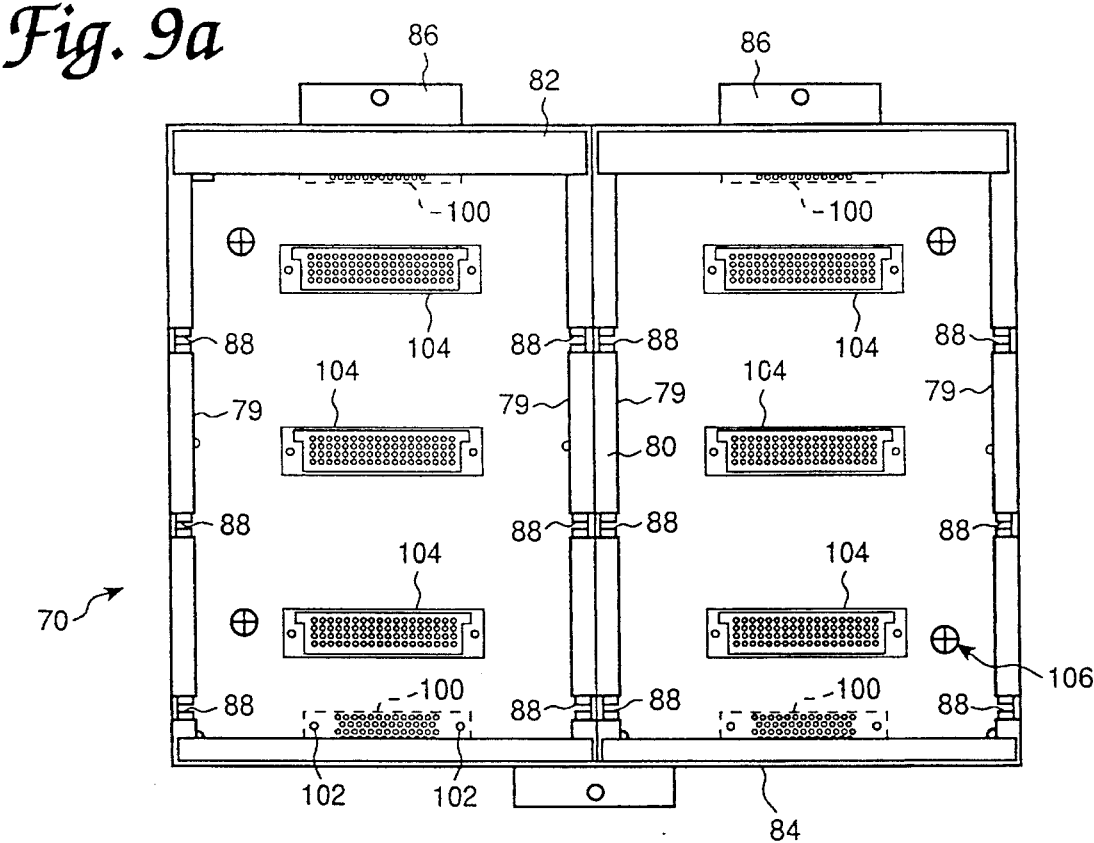
FIGS. 9a and 9b are a front view and a side view of the assembled disc array chassis.
Figure 9B:
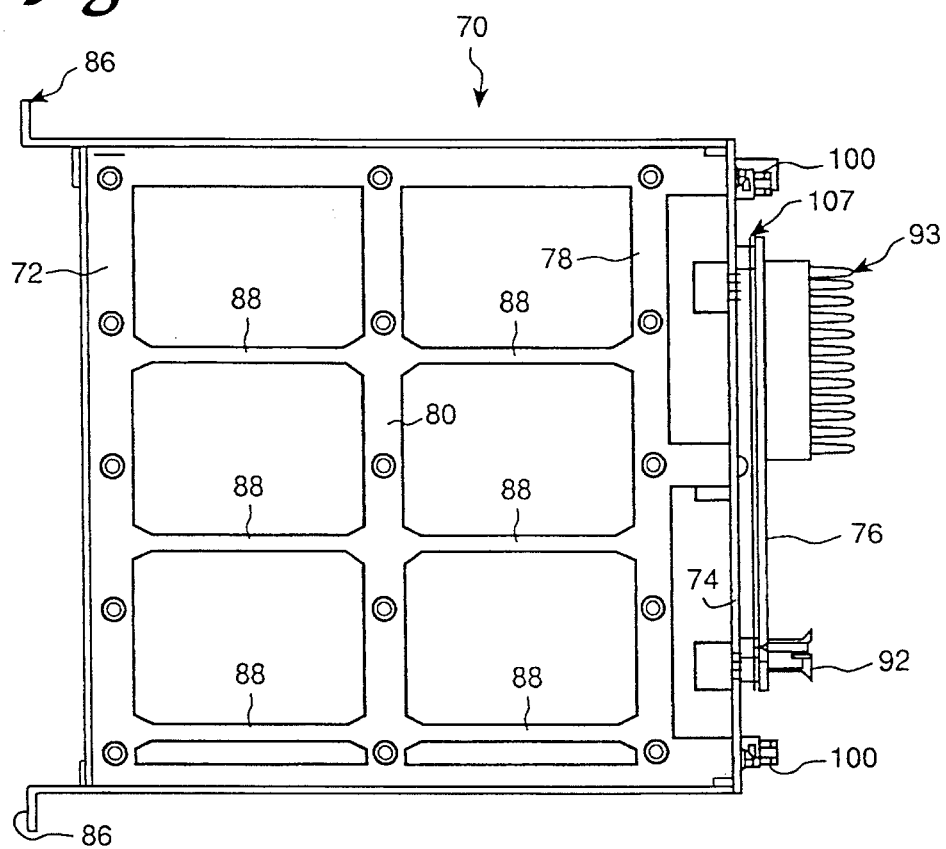

Skirt 30, shown in FIGS. 6a and 6b, consists of an elongated plate 32 having depending edges or flanges 34 along each long side. The top of plate 32 is provided with raised lands 36 and a series of threaded holes 38. The rear end of each flange 34 is cut-out at 39. As noted, the top part 28 of each slide 26 is bolted through holes 38 to skirt 30. The clearance between the edges of bottom part 27 and the depending flanges 34 is kept small such that side-to-side motion is minimized. A bracket frame 40, shown in FIGS. 7a and 7b, is mounted on the slide skirt 30 and bolted to the lands 36. Bracket 40 consists of three shelves 42 carried by a skeleton frame 44 having a rear post structure 45, a back plate 46 and a front cut-out plate 47. An elongated door 48 attached to the edge of front plate 47 by a piano hinge 50 extends along the forward vertical edge of bracket 40 at its open side to below the lowest shelf 42. Cut-out plate 52 divides the front section of each shelf area into a narrow compartment 54 into which is received and mounted a conventional self contained motor-fan assembly 61, i.e., one for each shelf 42. Likewise, a self-contained motor-fan assembly is attached to the back of plate 52, and for each shelf. The front motor draws air into and across each shelf 42 and the rear motor exhausts it. The open side of each shelf 42 is provided with a flange 56 provided at intervals with threaded holes 58. The top of bracket 40 is provided with a slide 60 that cooperates with a complementary U shaped slide 62 mounted to the top of the cabinet to guide the bracket 40. A flange 64 with threaded holes 66 is provided on the open side of bracket 40 along its top edge.

Each shelf 42 of bracket 40 receives three disc array chassis 70 side-by-side, as shown in detail in FIGS. 8a, 8b, 9a and 9b. The chassis 70 consists of a cage 72 having a backplane (circuit board) 74 mounted to its rear and a power board (circuit board) 76 piggybacked on the backplane 74. The cage 72, shown in FIGS. 8a and 8b consists of an open frame 78 having front flanges 79 with frame 78 divided in half vertically by an open partition 80. A top plate 82 is fixed to the top and a bottom plate 84 is fixed to the bottom. Both plates 82 and 84, at the front have flanges 86 for attaching the cages to the flanges at the edges of shelves 42 on their open side. The open frame 78 defines three sets of slides 88 in each half of the cage 72. The rear of cage 72 defines tabs or flanges 90 on which is mounted a back plane (circuit board) 74 and on which is mounted (piggybacked) a power board 76. Board 76 has mounted on its a pin connector 92 for bringing power to board 76 and a conventional DC module with cooling fins 93 to step down a large DC power voltage, e.g., 380 volts to 5 volt and 12 volt supplies for providing power to a disc drive. Centering pins can blank connector 92, to facilitate centering connector 92. Suitable electrical connections are provided (not shown) between board 76 and backplane 74. Backplane 74 is provided at the top and bottom with pairs of I/O connectors 100 provided with flanking threaded holes 102 for facilitating connection by suitable multi-pin I/O connectors to each half (divided vertically) of backplane 74. On each half are provided three vertically spaced multi-pin connectors 104. Holes 106 are provided for mounting board 76 via spacers 107.

Figure 5:
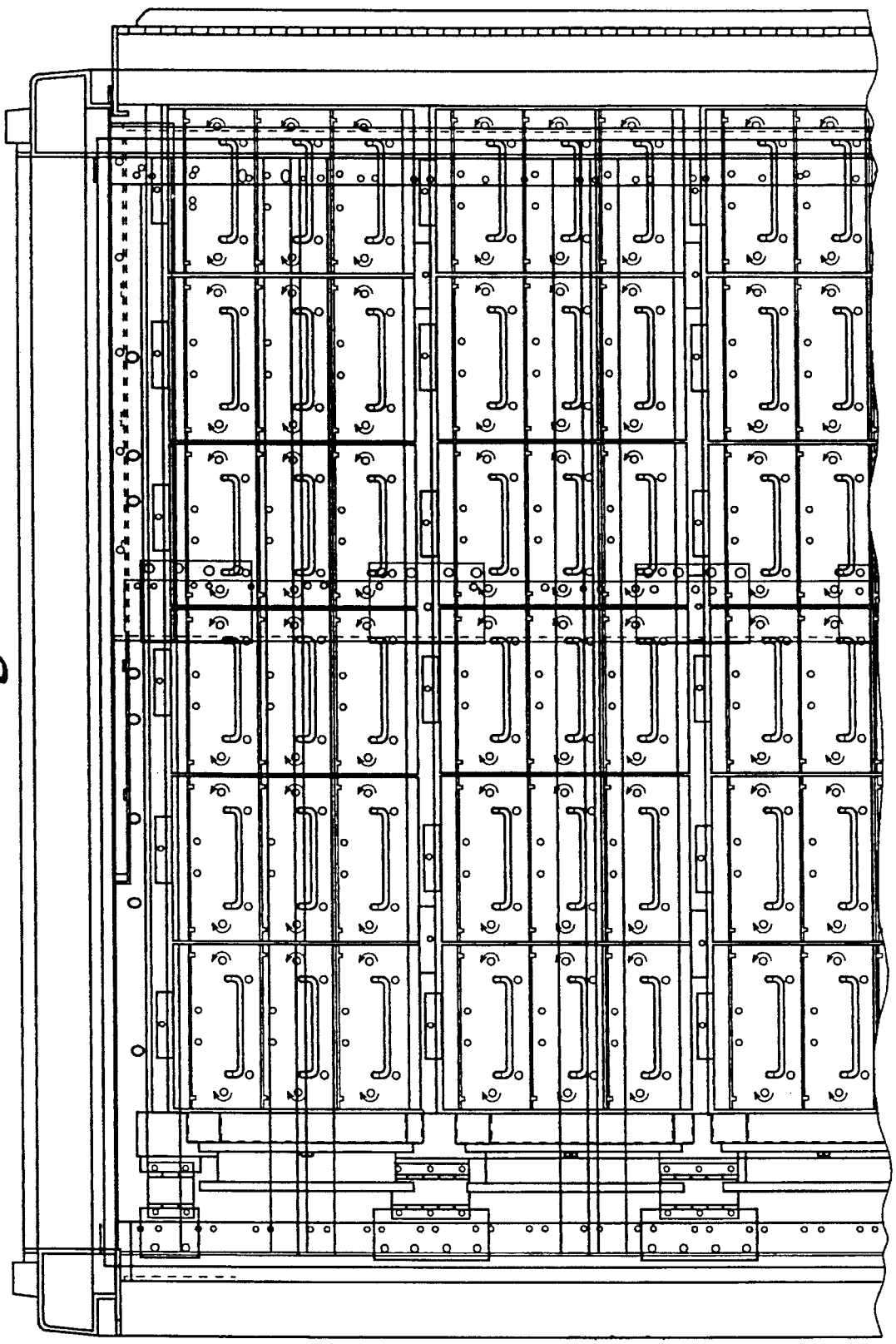
FIG. 5 is a side view with the side of the cabinet removed showing the disc drive storage.
Figure 10A:
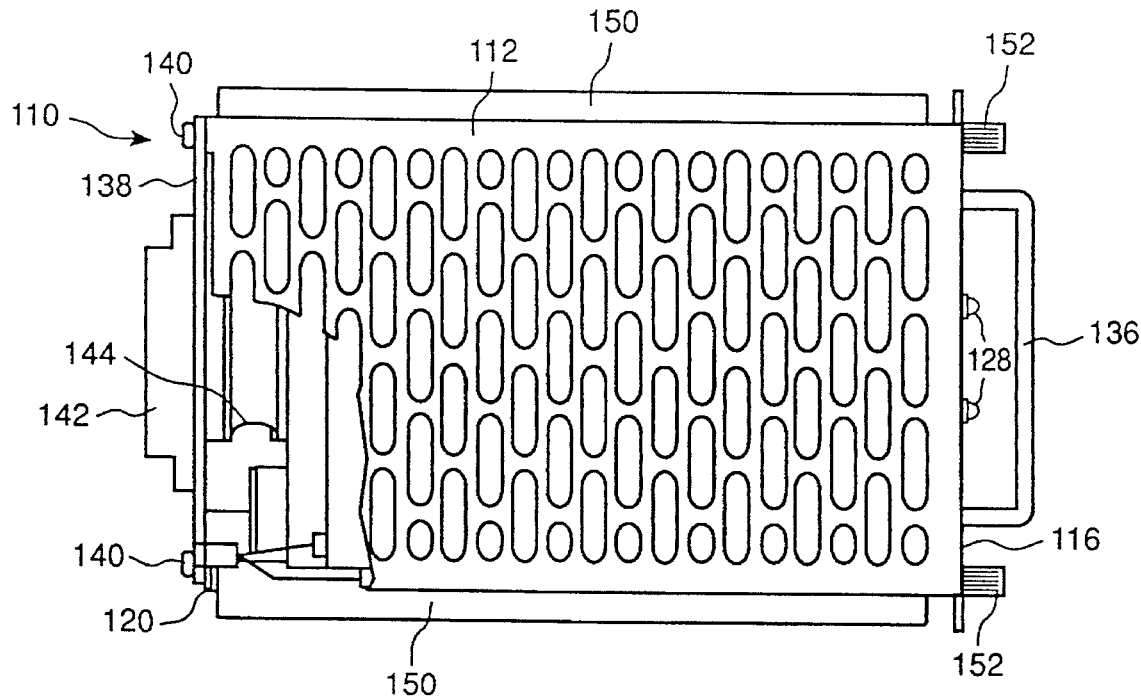
FIGS. 10a and 10b are a top view and a side view of the disc drive mounting.
Figure 10B:
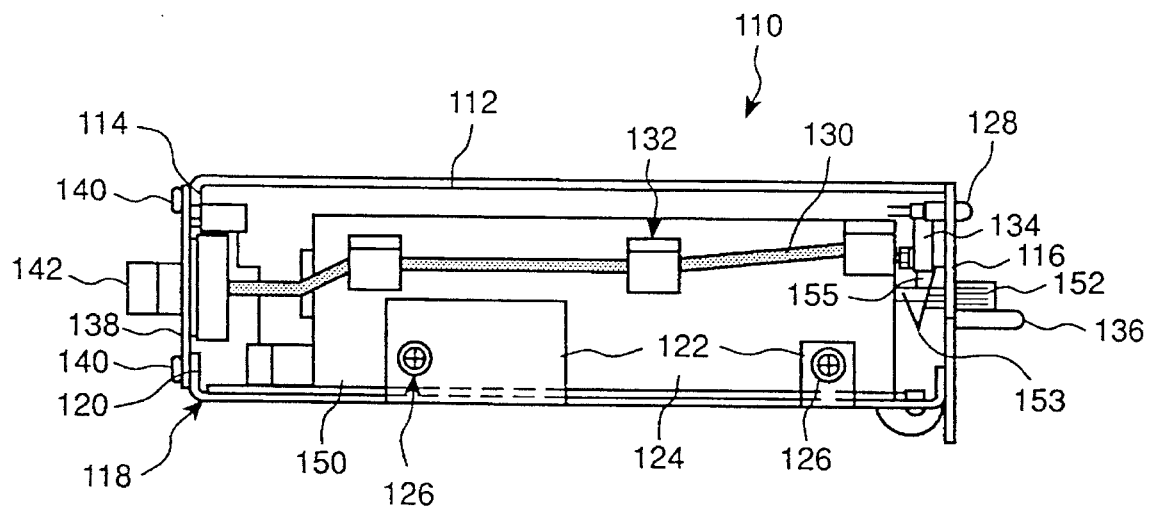
Figure 13:
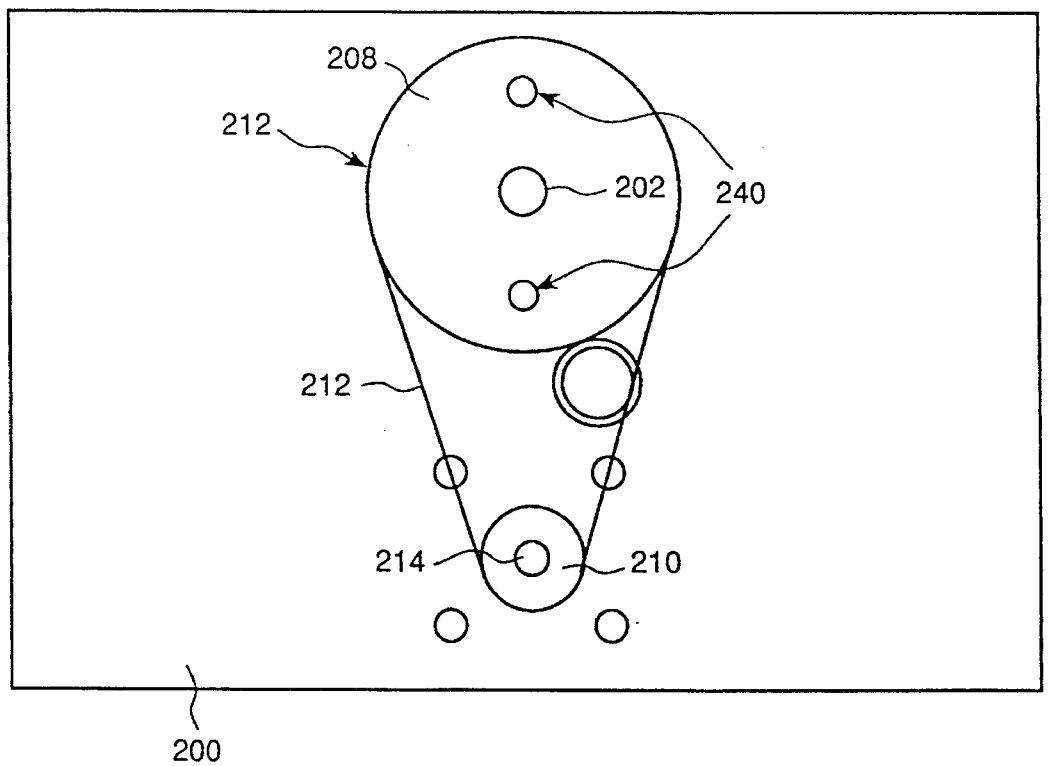
FIG. 13 is a section taken along line 13—13 of FIG. 12.
Figure 14:
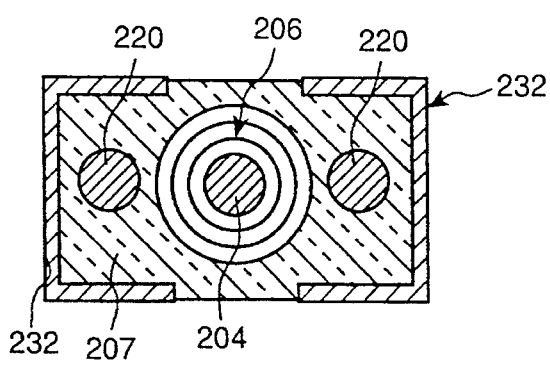
FIG. 14 is a section taken along line 14—14 of FIG. 12.
Figure 15:
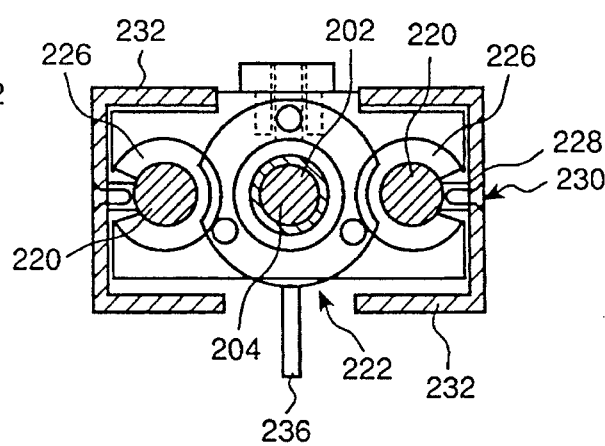
FIG. 15 is a section taken along line 15—15 of FIG. 12.

Disc drives in sub-assemblies are slid into slides 88 and plugged into the connectors 104. To this end, a disc drive subassembly is shown in FIGS. 10a and 10b and consists of housing 110 made from a perforated top plate 112 having turned down lugs 114 at its rear and a depending front skirt 116, a bottom plate 118 having turned up lugs 120 at its rear and fixed to skirt 116 at the front. Plate 118 has side flanges or lugs 122 which are used with screws 126 for mounting a disc drive 124 in housing 110. Lights 128 are connected to appropriate power supplies via cables 130, clips 132 and circuitry 134 to indicate power on/off and safe to remove. Handle 136 is fixed to skirt 116 to facilitate handling. A circuit board 138 is screwed by screws 140 into lugs 114, 120 to provide a back to the housing 110. Board 138 has multi-pin connection 142 mounted thereon which connects via suitable circuitry 144 to disc drive 124. Connector 142 mates with connector 104 of backplane 74. The sides of housing 110 are open and plastic slide bars 150 are mounted along the edges of bottom plate 118 so that bars 150 project outwardly. Bars 150 are received in slides 88 when housing 110 is inserted into the cage and the tolerance is kept tight so that connectors 142 and 104 mate more easily. Rotatably mounted knurled knobs 152 carry a half moon wire spring 153 that cams behind the front flanges 79 to lock the disk drive subassembly in the cage 70 and urge the connectors together. Spring 153 also actuates a microswitch 155 when locked to complete the power circuit. A drawer fully loaded with disc drives (54 in the example shown) is seen in FIG. 5.

Referring now to FIGS. 16 and 17, a power shield 162 is shown consisting of a vertical sheet metal plate having a first bend 164 near its top to provide a horizontal run or shoulder 168, a second bend 166 to provide a vertical drop or run 170, a third bend 172 to provide a short reverse horizontal run 174, a fourth bend 176 to provide a short vertical drop 178, a fifth bend 180 to provide a further rear horizontal run 182, and a sixth bend 184. Flanges 188 are provided along both upper and lower edges 171 and 173. A trough or channel 190 is defined by vertical drop 170, the ends 175 of which are bent in to close the ends. A series of multi-pin connector blocks 192 with centering holes 193 are fixed in spaced relation on vertical drop 178 on the inside thereof and are connected by wiring 194 for bringing power to these locations. A power plug 196 is shown connected to wiring 194. Shield 162 is connected to the back wall 46 of bracket frame 40, one at each shelf 42, with the power blocks 192 facing inwardly at the appropriate sites to mate with pin connectors 92 and centering pins on the boards 76.

Between each pair of slides, upon which is mounted a slide skirt 30, is arranged a linear actuator consisting of a motor mounting plate or block 200 into which is journalled via bearing 206 and end block 207 one end 202 of a lead screw 204. A pulley 208 is fixed to end 202 and pulley 208 is mechanically connected to a pulley 210 by a belt 212. Pulleys 208 and 210 and belt 212 are ribbed to ensure a positive drive. Pulley 210 is fixed to the end of motor shaft 214 driven by reversible stepping motor 216 with pulley 210 journalled in motor plate 200. Plate 200 is fixed to the frame 20 of the cabinet 10 in the vicinity of rail 16. The other end of lead screw 204 is journalled in an end block (not shown) fixed to the frame 20 in the vicinity of rail 14. A pair of guide rods 220 is fixed in the end block 207 at one end and the end block near rail 14 at the other end. A nut 222 rides on the thread screw 204 with nut 222 fixed by bolts in a carriage 224 having two through holes that receive the rods 220. Arcuate linear bushings 226 are housed in the carriage 224 and rods 220 are held in position by index plugs 228 and screws 230 which fit in the open arc of the bushings 226. Left and right U-shaped channels or rails 232, serving as the mounting for plugs 228, hold and guide the carriage 224 as its moves relative to screw 204. A pair of counter magnets 240 are diametrically mounted in pulley 208 and cooperate with hall effect sensors mounted on a circuit board 201 mounted on motor mounting plate 200. A fitting 234 is fixed in the top of carriage 224 in the opening between the rails 232 and is the means by which the slide skirt 30 is removably fixed at its rear end to carriage 224. A vane 236 fixed to and depending from carriage 224 is arranged to intercept optical sensor (photocell) 238 (schematically shown) to send a signal to the motor control circuit shown in FIGS. 18a–c. The motor control circuit is contained on circuit board 201.

Data and power are brought into the cabinet 10 through connectors in a side wall or other convenient location. Internal cables lead from the trough connectors to and through conventional flexible-cable tunnels 250 fixed at one end to bar 22 and at their other ends to bracket frame 40 at the locations shown in FIG. 7b via double hinged brackets 252. A cable tunnel 250 is provided for the top and bottom of each shelf 42. I/O cables (not shown), terminating in appropriate pin connectors are brought to and connected with the top and bottom connectors 100 on each backplane 74. In this regard, the top connections pass over shoulder 168 and then enter between flanges 188. Likewise, the bottom connectors pass under shoulder 182 and enter between flanges 188. The channel 190 receives the fins of the DC modules 93 and a deflector plate 63 deflects a portion of the air flow from fan 61 through channel 190 to cool the DC modules.

Figure 18A:
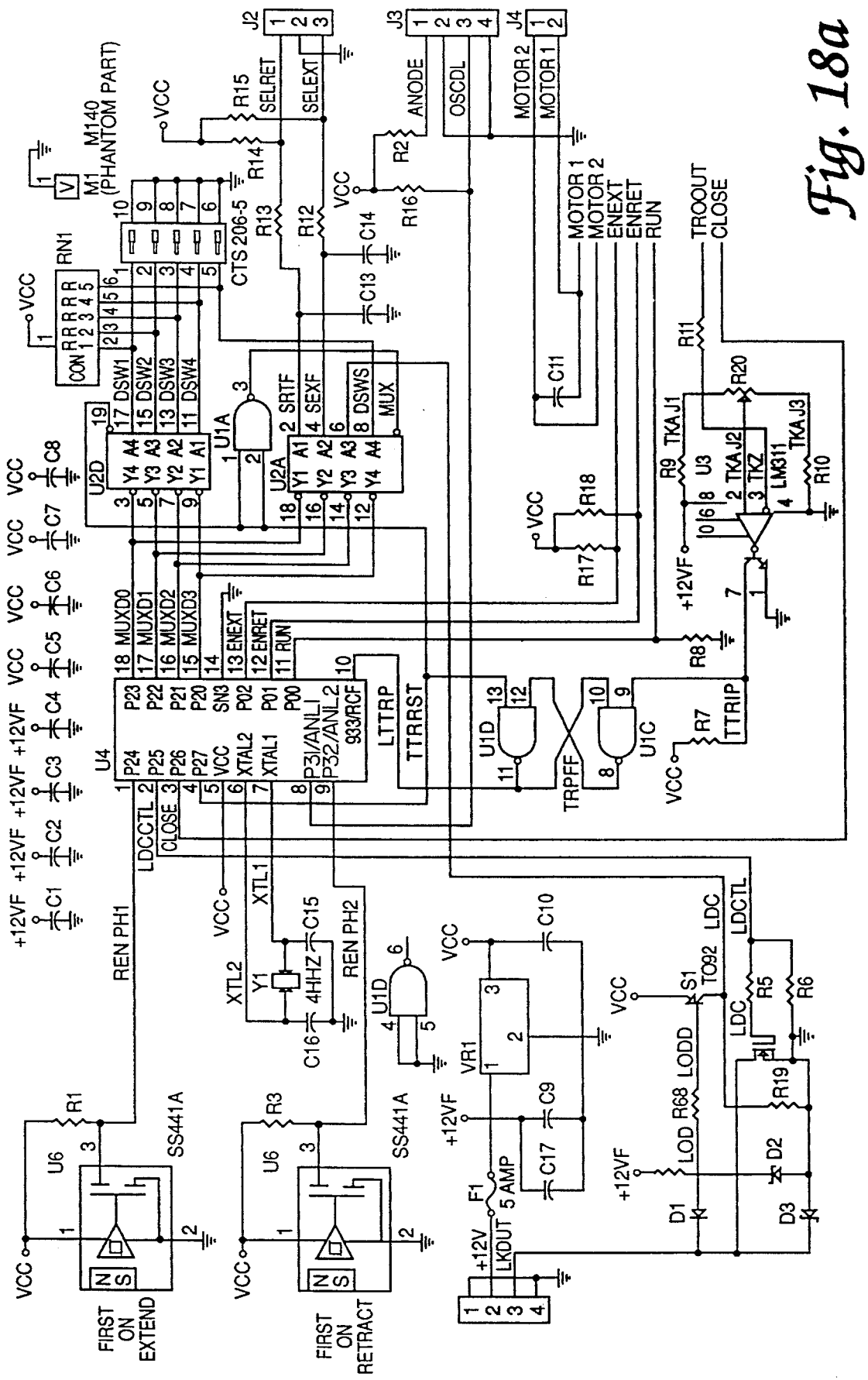
FIGS. 18a, b and c are a schematic circuit of the controller.
Figure 18B:
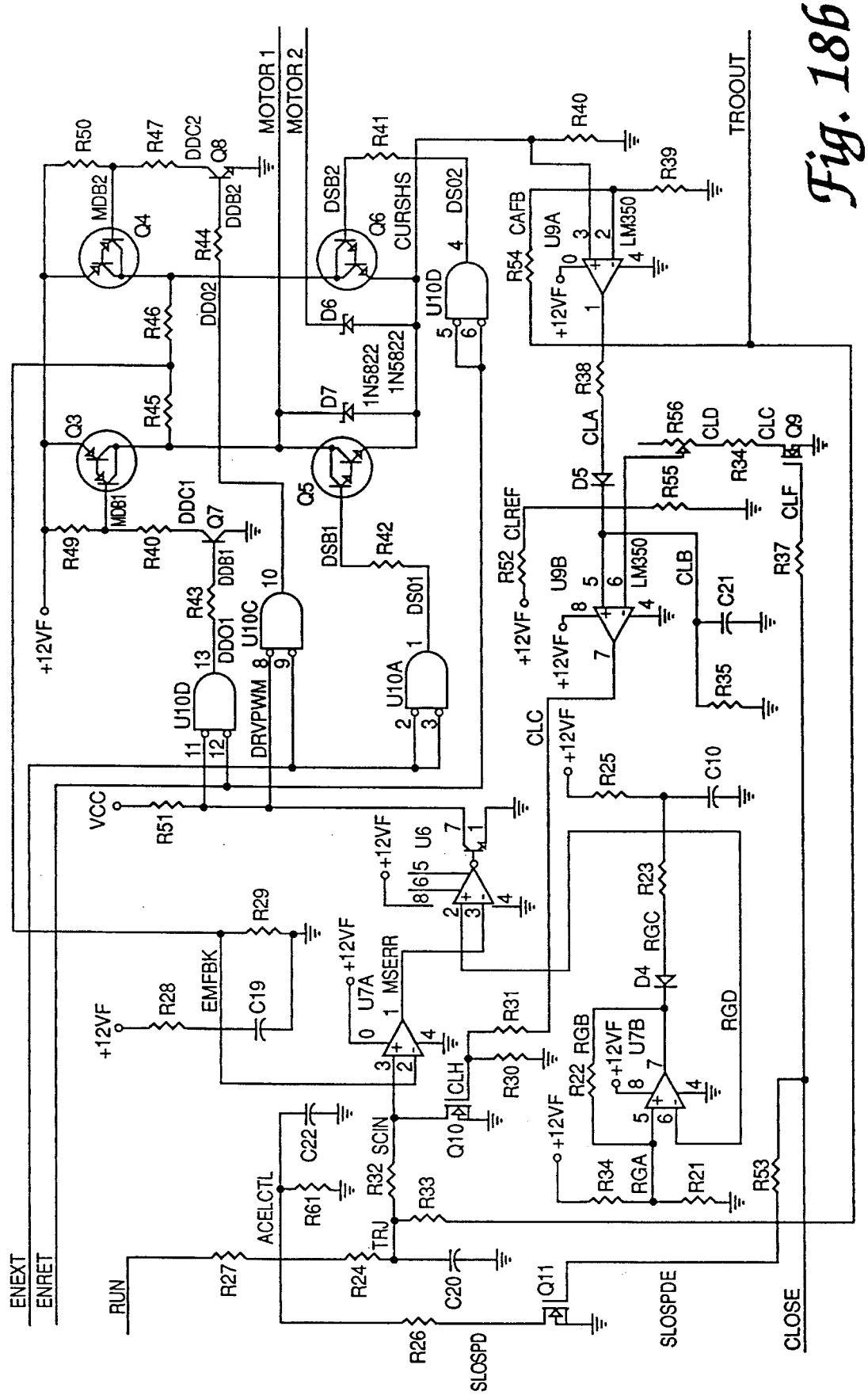
Figure 18C:
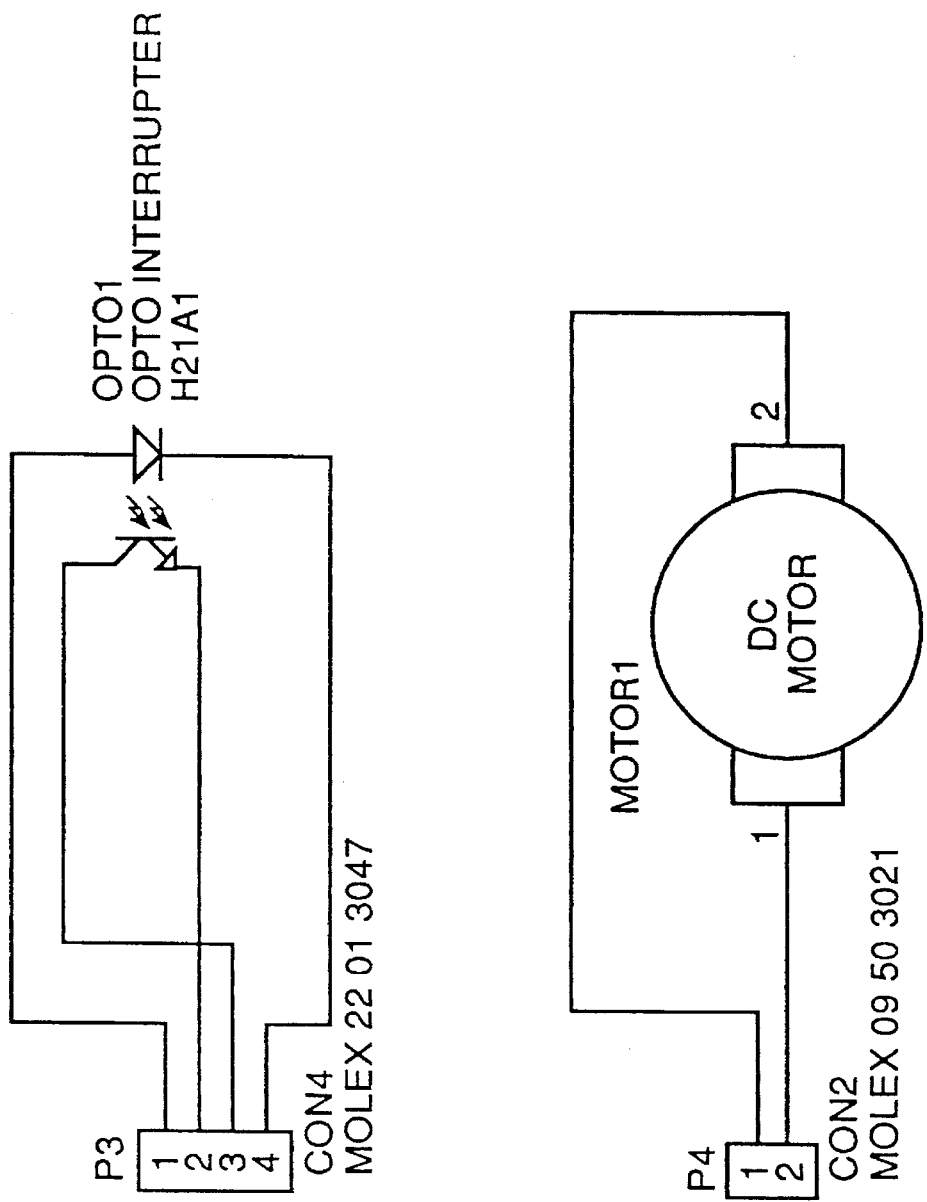

Referring now to FIGS. 18a–c, which constitute a single schematic diagram, the controller contained on circuit board 201 for the linear actuator will now be described.

The linear actuator controller is a Zilog Z86E08 based microcontroller couple with a stand alone bi-directional Pulse Width Modulated DC motor controller, with an integrated magnetic rotary encoder.

The Z86E08 provides logic for the front panel IN/OUT switch 300, retracted end stop and pull as well as decoding for the rotary encoder and extended end limit control. In addition it stops the mechanism when its senses over current (or over torque) from the motor controller.

The DC motor controller is comprised of a ramp generator (U7b), a comparator (U7a) which compares the back emf from the motor with a reference voltage. The error signal is then compared with the output from the ramp generator by a second comparator (U8), which in turn controls the width of the drive pulse going to the motor. Motor current is sensed through (R40) and amplified by (U9a). A portion of this output is fed back into the reference input of (U7a) to compensate for losses due to the resistance of the motor armature. It is also fed into the inputs of two comparators (U9b & U3). The other input of (U9b) is connected to a reference voltage which sets maximum motor current. The output of (U9b) is fed into the gate on a FET connected between the reference input on (U7a) and ground, so that when the maximum set motor current is reached power to the motor starts to be reduced to prevent the set current from being exceeded. Also connected to the reference input to (U9b) is a variable resistor (R56) which is indirectly connected to (Q9) which is controlled by the Z86E08 to lower the current set level when the actuator is pulling the stop at the home position. The comparator (U3) compares the output of (U9a) with a second current limit reference set by (R20). The current trip point of this reference is lower than that of the current limit controlled by (U9b). When the threshold is exceeded the output of (U3) is latched by (U1c & U1d) and fed to Z86E08 to stop the motor until it is manually restarted by the front panel switch 300. During start the Z86E08 ignores this output until break away friction and inertia have been overcome, at this point it resets the latch.

Acceleration is accomplished through a time constant from (R27 to C22) which causes the input reference voltage to rise and decay slowly. During close at the home position the reference voltage is lowered by the Z86E08 through (Q11 and R46) to cause the motor to slow down during return to home position.

Home position is detected by an optical interrupter mounted on the track behind the motor plate. When the Z86E08 senses that it has left the home position, a software counter is present according to (S1). As the actuator extends the counter counts down and rolls over to a minus number. Hall Effect sensors (U5 & U6) provide a quadrature output to the Z86E08 as the magnets 240 in the drive pulley 208 pass the sensors. The output of (U6) drives both negative and positive triggered interrupts (coupled inside the Z86E08) and the direction is decoded by looking at the output of (U5). The two magnets provide for one count every tenth inch of travel. The starting count is offset so that the max switch setting is the end of travel, and the LSB (right hand) switch is equal to a tenth of an inch.

In addition, the controller circuits for the two motors are interlocked in a conventional way so that only one motor and, therefore, only one drawer can be opened at a time. This ensures that at least one drawer, at all times, is closed. The controller operates to enable one drawer to be partly or completely opened while an associated computer is operating and all disc drives are operating and for one or more disc drives to be serviced or removed and replaced without disturbing the operation of all other disc drives. In short, no downtime.

Front perforated cover plates 302 are provided with snap-on connectors to attach to front cut-out plate 47. In the specific embodiment shown, two drawers 24 are provided.

The bottom half of the cabinet is used in this embodiment for mounting conventional racks 304 and inserting a plurality of circuit boards that can function as controllers for the disc drives, CPUs, memory, etc., arranged for communicating with a mainframe. The space below racks 304 is used for blowers 306 driven by motors, not shown, to keep racks 304 and its board cooled. If desired, the entire cabinet can be used for disc drives, in which case, four drawers are installed, two in the upper half and two in the lower half. In this case, the controllers, CPUs, memory, etc., would be housed in an adjacent cabinet. Since the drawers 24 fully loaded are heavy, it is desirable to weight the bottom of the cabinet with counterbalancing ballast 308 so that accidental tipping does not pose a risk.

Although the present invention has been shown and described in terms of a preferred specific embodiment, changes and modifications are possible which do not depart from the spirit, scope or concepts taught herein. Such changes and modifications are deemed to fall with the purview of the invention as claimed.

What is claimed:

1. An apparatus comprising:

a housing having a front, a rear and two sides;

an elongated slide mounted front to rear in the housing;

an elongated drawer having at least one open side mounted on the slide for withdrawing the same from the front of the housing and exposing the at least one open side thereof;

means, mounted in the housing, for moving the drawer from a closed position wholly contained in the housing to an open position withdrawn from the housing with the at least one open side exposed;

said means for moving including a motor connected to move the drawer and control means for controlling the motor to moderate starting and stopping of the motor to avoid shocks to the drawer;

mounting means having I/O connections for mounting an array of disc drives in the drawer to be accessible from the at least one open side of the drawer;

cabling means for introducing I/O cables to the mounting means with the cables terminated in connections that mate with the I/O connections of the mounting means; and ventilation means, disposed on said elongated drawer, for forcing a flow of air into and out of the elongated drawer.

2. An apparatus according to claim 1, wherein the housing is fitted with two elongated drawers, side-by-side, mounted on separate elongated slides with an associated means for individually moving each drawer.

3. An apparatus according to claim 2, wherein interlock means are provided for allowing only one drawer to be withdrawn at a time.

4. An apparatus according to claim 1, wherein the mounting means includes a disc cage for mounting a plurality of disc drives, said cage including a backplane comprising a circuit board presenting, toward the interior of the cage, a plurality of pin connectors and, toward the exterior of the cage, a plurality of connection sites for I/O cables.

5. An apparatus according to claim 4, wherein the cage includes a plurality of spaced slides.

6. An apparatus according to claim 5, wherein the cage includes two rows of spaced slides.

7. An apparatus according to claim 6, wherein the spaced slides of each row are vertically spaced.

8. An apparatus according to claim 5, and further comprising a plurality of disc drive assemblies, each having at least one slide that mates with one slide of said cage to orient said assembly in said cage and a pin connector that mates with a pin connector of the cage when the assembly is slid into the cage.

9. An apparatus according to claim 5, wherein the spaced slides are vertically spaced.

10. An apparatus according to claim 4, and further comprising a plurality of disc drives, each of which is individually mounted in a disc housing having, at its rear, a circuit board including a pin connector that mates with one pin connector of said cage.

11. An apparatus according to claim 4, and further comprising a power board having an outwardly facing pin connector mounted on said backplane.

12. An apparatus according to claim 11, wherein a pin connector is mounted on said drawer at a location to mate with the outwardly facing connector of the power board when the disc cage is mounted in the drawer.

13. An apparatus according to claim 12, and further comprising a plate, to which said pin connector is fixed, for mounting said pin connector on said drawer.

14. An apparatus according to claim 13, and further comprising at least one fan assembly disposed on at least one end of the elongated drawer so as to pass a flow of air into and out of the elongated drawer.

15. An apparatus according to claim 14, wherein said plate includes a channel defined therein, and further comprising a deflector plate for deflecting a portion of the flow of air through said channel.

16. An apparatus according to claim 11, wherein the outwardly facing pin connector is flanked by a centering pin receivable in centering holes defined in said pin connector.

17. An apparatus according to claim 1, wherein ballast is provided in the bottom of the housing.

18. An apparatus according to claim 1, wherein said ventilation means comprises a fan assembly disposed on at least one end of the elongated drawer so as to draw a flow of air into the elongated drawer.

19. An apparatus according to claim 18, wherein said ventilation means further comprises an additional fan assembly disposed on the other end of the drawer so as to exhaust the flow of air from the elongated drawer.

20. An apparatus comprising:

a housing having a front, a rear and two sides;

an elongated slide mounted front to rear in the housing;

an elongated drawer having at least one open side mounted on the slide for withdrawing the same from the front of the housing and exposing the at least one open side thereof;

actuator means, mounted in the housing adjacent the slide, for moving the drawer from a closed position wholly contained in the housing to an open position withdrawn from the housing with the at least one open side exposed;

said actuator means including a motor connected to move the drawer and control means for controlling the motor to moderate starting and stopping of the motor to avoid shocks to the drawer;

mounting means having I/O connections for mounting an array of disc drives in the drawer to be accessible from the at least one open side of the drawer cabling means for introducing I/O cables to the mounting means with the cables terminated in connections that mate with the I/O connections of the mounting means; and ventilation means, disposed on said elongated drawer, for forcing a flow of air into and out of the elongated drawer.

21. An apparatus according to claim 20, wherein the actuator means includes a member connected to the drawer and an optical sensor cooperating with said member to index the closed position of the drawer as the home position.

22. An apparatus according to claim 20, wherein the actuator means includes means for rotating spaced magnets in cooperation with movement of said drawer with said magnets coacting with sensors to detect a number and a direction of revolutions of the magnets to provide an input to the control means.

23. An apparatus according to claim 20, wherein the housing is fitted with two elongated drawers, side-by-side, each of said two elongated drawers being mounted on a separate slide with an associated actuator means for individually withdrawing each drawer.

24. An apparatus according to claim 20, wherein the mounting means includes a disc cage for mounting a plurality of disc drives, said cage including a backplane comprising a circuit board presenting, toward the interior of the cage, a plurality of pin connectors and, toward the exterior of the cage, a plurality of connection sites for I/O cables.

25. An apparatus according to claim 24, wherein the cage includes a plurality of spaced slides.

26. An apparatus according to claim 25, wherein the cage includes two rows of spaced slides.

27. An apparatus according to claim 26 wherein the spaced slides of each row are vertically spaced.

28. An apparatus according to claim 25, and further comprising a plurality of disc drive assemblies, each having at least one slide that mates with one slide of said cage to orient said assembly in said cage and a pin connector that mates with a pin connector of the cage when the assembly is slid into the cage.

29. An apparatus according to claim 28, and further comprising locking means for locking each of said disc drive assemblies in said cage.

30. An apparatus according to claim 29, wherein said locking means comprises a movable wire spring.

31. An apparatus according to claim 25, wherein the spaced slides are vertically spaced.

32. An apparatus according to claim 24, and further comprising a plurality of disc drives, each of which is individually mounted in a disc housing having, at its rear, a circuit board including a pin connector that mates with one pin connector of said cage.

33. An apparatus according to claim 24, and further comprising a power board having an outwardly facing pin connector mounted on said backplane.

34. An apparatus according to claim 33, wherein a pin connector is mounted on said drawer at a location to mate with the outwardly facing pin connector of the power board when the disc cage is mounted in the drawer.

35. An apparatus according to claim 34, and further comprising a plate, to which said pin connector is fixed, for mounting said pin connector on said drawer.

36. An apparatus according to claim 35, wherein said ventilation means comprises at least one fan assembly disposed on at least one end of the elongated drawer so as to pass a flow of air into and out of the elongated drawer.

37. An apparatus according to claim 36, wherein said plate includes a channel defined therein, and further comprising a deflector plate for deflecting a portion of the flow of air through said channel.

38. An apparatus according to claim 33, wherein the outwardly facing pin connector is flanked by a centering pin receivable in centering holes defined in said pin connector.

39. An apparatus according to claim 20, and further comprising ballast provided in the bottom of the housing.

40. An apparatus according to claim 20, wherein said ventilation means comprises a fan assembly disposed on at least one end of the elongated drawer so as to draw a flow of air into the elongated drawer.

41. An apparatus according to claim 40, wherein said ventilation means further comprises an additional fan assembly disposed on the other end of the drawer so as to exhaust the flow of air from the elongated drawer.

* * * * *